May 20, 1969  J. W. CLARK  3,445,325
LAMINATED WOOD BEAM WITH IMPROVED PRESERVATIVE TREATMENT
Filed Aug. 22, 1966

INVENTOR.
JOE W. CLARK
BY R. Hoffman
ATTORNEY ent Office 3,445,325
Patented May 20, 1969

3,445,325
LAMINATED WOOD BEAM WITH IMPROVED PRESERVATIVE TREATMENT
Joe W. Clark, Madison, Wis., assignor to the United States of America as represented by the Secretary of Agriculture
Filed Aug. 22, 1966, Ser. No. 574,506
Int. Cl. B32b 7/02
U.S. Cl. 161—166                                     5 Claims A nonexclusive, irrevocable, royalty-free license in the invention herein described throughout the world for all purposes of the United States Government, with the power to grant sub-licenses for such purposes, is hereby granted to the Government of the United States of America.

This invention relates to laminated wood beams and more particularly to laminated beams with improvements in the method of constructing and preservatively treating said beams in order to make them more suitable for use where appreciable decay hazards may exist or occur. This invention relates to constructing laminated beams so that those surfaces that may be liable to decay hazards are made from wood members that are receptive to deep penetration by or are fully treatable with wood preservatives.

It is well known that dampness favors the growth of fungi which destroy wood. Untreated wood of many species decays in any situation where it can collect moisture and remain damp for a long time or where it is alternately wet and dry. Therefore, consumers who use wood in environments in which decay hazards are great have turned to the use of wood treated with wood preservatives. But, when fasteners (i.e., nails, bolts, etc.) or other attachments penetrate deeper into the wood than the preservatives, a condition is set up whereby water can work its way into the untreated portion of the wood and decay fungus growth can become established. Therefore only woods that are receptive to deep penetration by wood preservatives are used where this condition may occur. However, certain woods, such as Rocky Mountain Douglas-fir, western larch, and to a lesser degree coastal Douglas-fir, resist deep penetration by most wood preservatives. Most wood preservatives will only penetrate the coastal Douglas-fir to about ¾ inch depth and the Rocky Mountain Douglas-fir to about ¹⁄₁₆ inch to ¼ inch depth. By incising, the latter can be increased to about ½ inch depth, but this still is not satisfactory as thorough penetration cannot be obtained except in less than 1-inch-thick boards. In fact, the American Wood Preservers' Association (A.W.P.A.) and other agencies refuse to recognize the Rocky Mountain Douglas-fir as a treatable species suitable for exterior use where decay hazards may exist. In order to make use of these and other difficult-to-treat woods in situations where thorough preservative treatment is required in large laminated beams, consumers have to use wood that has been treated as individual plies before lamination. However, it is necessarily expensive to treat each ply individually. As an alternative, these laminated beams can be made from easy-to-treat woods, such as southern yellow pine sapwood or ponderosa pine sapwood, which are receptive to full penetration by most all conventional wood preservatives even after lamination providing only one layer of glue is used at each bonding surface. But, this approach is also expensive in those areas where southern yellow pine sapwood or ponderosa pine sapwood is not grown and consequently must be imported.

Accordingly, one object of this invention is to provide a laminated beam that is suitable for exterior use where decay hazards exist even though it is comprised in part of wood that is not receptive to full penetration by wood preservatives.

Another object is to increase the serviceability of wood that is not receptive to full penetration of wood preservatives, thereby permitting the use of said wood in those areas where only such wood grows locally, so that the greatest quantity of wood to be used even where decay protection is required will be locally grown and will not have to be imported from other wood growing regions.

These and other objects which will be apparent to those skilled in the art are achieved in accordance with the invention described in the specification, claims, and in the accompanying drawing in which:

In general, the principal improvement of the presently described invention resides in a laminated wood beam construction that is produced by bonding together a single ply or a plurality of plies of treatable wood and a beam or plurality of plies of untreatable wood, such that the treatable wood is the part of the total structure that will be exposed to decay hazards. As used herein treatable wood means any wood that is receptive to full penetration by wood preservatives; such woods are the sapwood of southern yellow pine and ponderosa pine, which can be fully treated even after lamination. Untreatable wood means any wood that is not receptive to full penetration by wood preservatives unless the ply is less than a nominal 2 inches in thickness; examples of such wood are Rocky Mountain Douglas-fir, western larch, and coastal Douglas-fir.

Figure 1:
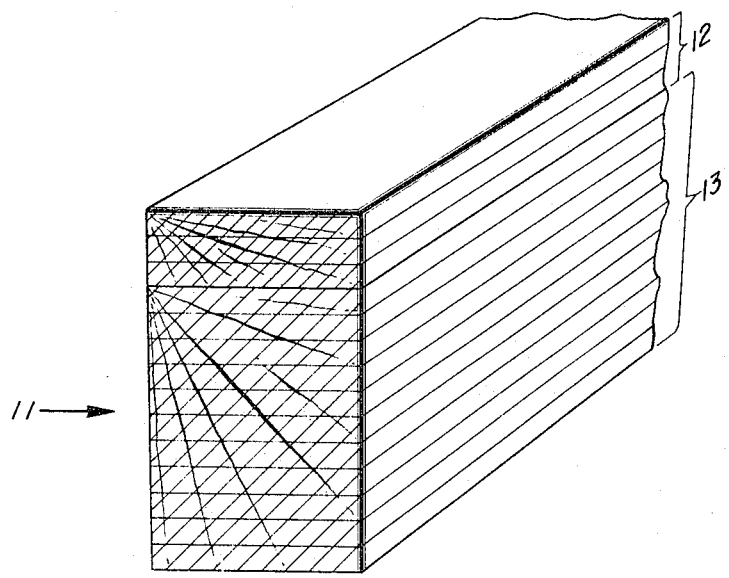
FIGURE 1 is an oblique view of the end of the laminated beam.

More specifically, referring to FIGURE 1, a bridge stringer 11 is formed by bonding a top cap 12 comprising three plies of southern yellow pine sapwood to a plurality of plies, indicated by 13, of Rocky Mountain Douglas-fir. The completed stringer is then treated with any conventional wood preservative by conventional method. The preservative will penetrate all the surfaces of the beam to give protection against checking and weather hazard. Moreover, the preservative will fully penetrate the top cap, which is the only part of the stringer to which fasteners are attached, so that the fasteners do not penetrate deeper than the preservative. This is true when the conventional toe-nail method is used to attach the bridge floor to the stringers. If other methods of attaching fasteners to the stringers are used, more plies of treatable wood may be required. As these stringers are sometimes from 4 feet to 6 feet thick, it is obvious that the greatest portion of the stringer is made from untreatable wood.

The preferred preservative is an oil borne preservative comprising either creosote or pentachlorophenol or a combination of the two in heavy oil, but any conventional wood preservative may be used. An oil borne preservative is preferred because it creates a moisture retardation coating that gives better protection against checking. As an alternative the plies comprising the top cap can be pretreated, before bonding to the untreatable wood, with either the same preservative used in treating the completed stringer or with any other conventional wood preservative. This pretreating of the top cap may be done to the plies individually or as a unit, and is done to double the protection. If pretreating is going to be used, chromated copper arsenate or ammonical copper arsenate are the preferred preservatives but any may be used.

Figure 2:
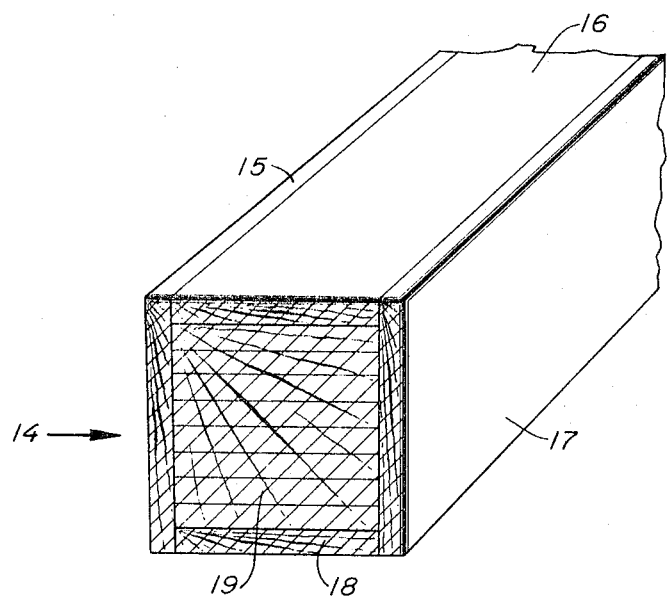
FIGURE 2 is an oblique view of the end of a modified form of the invention.

FIGURE 2 shows a modified form of the invention. A beam 14 has been produced by bonding plies of treatable wood, 15, 16, 17, and 18, to each of the four sides of core 19. The core is shown to be a laminated structure, but may be a single beam of wood. This modified form of the invention may be used for telephone poles, fence posts, lamp posts, and numerous other applications that are subject to decay hazards.

It is understood that the embodiments described herein are merely illustrative of the presently described invention, and numerous modifications, readily apparent to those skilled in the art, could be incorporated herein. The species of wood used depends on the local supply. For example, the top cap of the beam described herein may be comprised of ponderosa pine sapwood or any fully treatable wood, and not just southern yellow pine sapwood. Also Rocky Mountain Douglas-fir may be substituted for by other untreatable wood species, such as western larch or costal Douglas-fir, depending on the local supply. The number of plies of treatable wood used and the number of sides of the untreatable wood to which the treatable plies are bonded depends only on the depth and area of protection desired. Further, the untreatable portion of the beam does not have to be of laminated structure but may be a single beam.

Having thus disclosed my invention, I claim:

1. A laminated wood beam treated with wood preservative, said beam comprising in combination a plurality of plies of wood of a first species that is not receptive to full penetration by said wood preservative, said plies being bonded together to constitute a base portion, and a top cap bonded to said base portion and comprising a plurality of plies of wood of a second species that is receptive to full penetration by said wood preservative to fully treat the same, the thickness of said fully treated top cap being such that when fasteners are attached to said top cap they do not penetrate deeper than the preservative.

2. The laminated beam of claim 1 wherein the wood that is not receptive to full penetration by wood preservatives is Rocky Mountain Douglas-fir.

3. The laminated beam of claim 2 wherein the top cap of wood that is receptive to full penetration by wood preservatives is southern yellow pine sapwood.

4. The laminated beam of claim 3 wherein said top cap is pretreated with wood preservative before being bonded to the wood that is not receptive to full penetration by wood preservatives.

5. A laminated wood beam treated with wood preservative, said beam comprising in combination a plurality of plies of wood of a first species that is receptive to full penetration by said wood preservative bonded to a plurality of the sides of a beam of wood of a second species that is not receptive to full penetration by said wood preservative, said plurality of plies being fully treated by said preservative and completely surrounding said beam of wood to protect the same from decay hazards to which said beam is exposed.

References Cited

UNITED STATES PATENTS 2,563,821  8/1951  Denig et al. _____ 161—230

ROBERT F. BURNETT, *Primary Examiner.*

LINDA M. CARLIN, *Assistant Examiner.*

U.S. Cl. X.R.

52—727; 117—149